United States Patent [19]

Lunev et al.

[11] 4,196,938

[45] Apr. 8, 1980

[54] GAS-DISCHARGE CHAMBER ELECTRODE AND ELECTRODE SYSTEM USING SAME

[76] Inventors: Evgeny I. Lunev, ulitsa Shkolnaya, 11, kv. 56; Vladislav M. Nesterenko, ulitsa Tsentralnaya 26, kv. 201, both of Troitsk, Moskovskaya oblast; Naum A. Iofis, ulitsa Stroitelei, 4, korpus 7, kv. 14; Zhanna A. Lavrova, Obolensky pereulok, 9, korpus 3, kv. 46, both of Moscow; Alexandr I. Bondarenko, ulitsa Fevralskaya, 11, kv. 55, Klimovsk, Moskovskaya oblast; Felix K. Kosyrev, ulitsa Tsentralnaya 14, kv. 27, Troitsk, Moskovskaya oblast; Valery A. Timofeev, ulitsa Zavodskaya, 9/1, kv. 14, Klimovsk, Moskovskaya oblast; Nina P. Kosyreva, ulitsa Tsentralnaya 14, kv. 27, Troitsk, Moskovskaya oblast; Vladimir I. Blokhin, ulitsa Tsentralnaya, 14, kv. 78, Troitsk, Moskovskaya oblast; Sergei V. Pashkin, ulitsa Tsentralnaya 26, kv. 160, Troitsk, Moskovskaya oblast all of U.S.S.R.

[21] Appl. No.: 913,336

[22] Filed: Jun. 7, 1978

[51] Int. Cl.$^2$ .................... H01J 17/06; H01J 17/28
[52] U.S. Cl. ........................... 313/32; 313/217; 313/353; 313/355
[58] Field of Search ............ 313/32, 231.4, 353, 313/355, 218, 311, 217; 331/94.5 PE

[56] References Cited

U.S. PATENT DOCUMENTS

| | | | |
|---|---|---|---|
| 1,647,364 | 11/1927 | Jancke | 313/353 X |
| 2,228,846 | 1/1941 | Prince | 313/32 X |
| 3,185,778 | 5/1965 | Giannini et al. | 313/231.4 X |
| 3,397,331 | 8/1968 | Burkhard | 313/311 X |
| 3,543,076 | 11/1970 | Haslund | 313/217 X |
| 3,761,761 | 9/1973 | Van Oostrom | 313/311 |
| 4,017,808 | 4/1977 | Fein et al. | 313/217 X |

OTHER PUBLICATIONS

"The Domain Instability of a Glow Discharge", by G. D. Mylnikov et al., *The Plasma Physics*, 1975, vol. I., Series 6, pp. 892–900.

"Atmospheric-Air Continuous-Action $CO_2$ Laser", by A. V. Artamonov et al., *Quantum Electronics*, 4, No. 1, 1977.

"A Study of the Electric Discharge Chamber of the Fastflow $CO_2$ Laser", by A. V. Artamonov et al., *Quatum Electronics*, 4, No. 2, 1977.

*Primary Examiner*—Palmer C. Demeo
*Attorney, Agent, or Firm*—Fleit & Jacobson

[57] ABSTRACT

A gas-discharge chamber electrode is proposed, comprising a hollow metal member with an emitting portion on the gas-discharge side and with coolant pipes. The hollow metal member is coated on the outside, except for the emitting portion, with a high-temperature dielectric. The electrode system includes at least two such electrodes.

14 Claims, 5 Drawing Figures

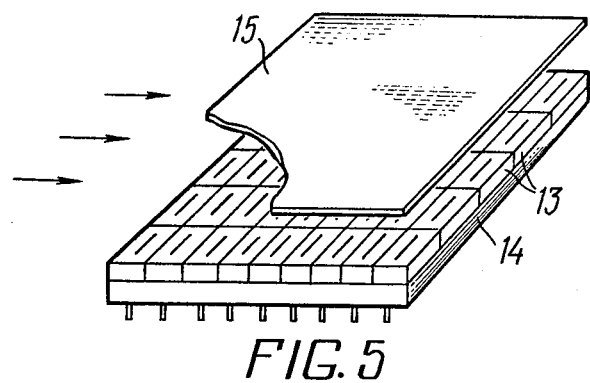
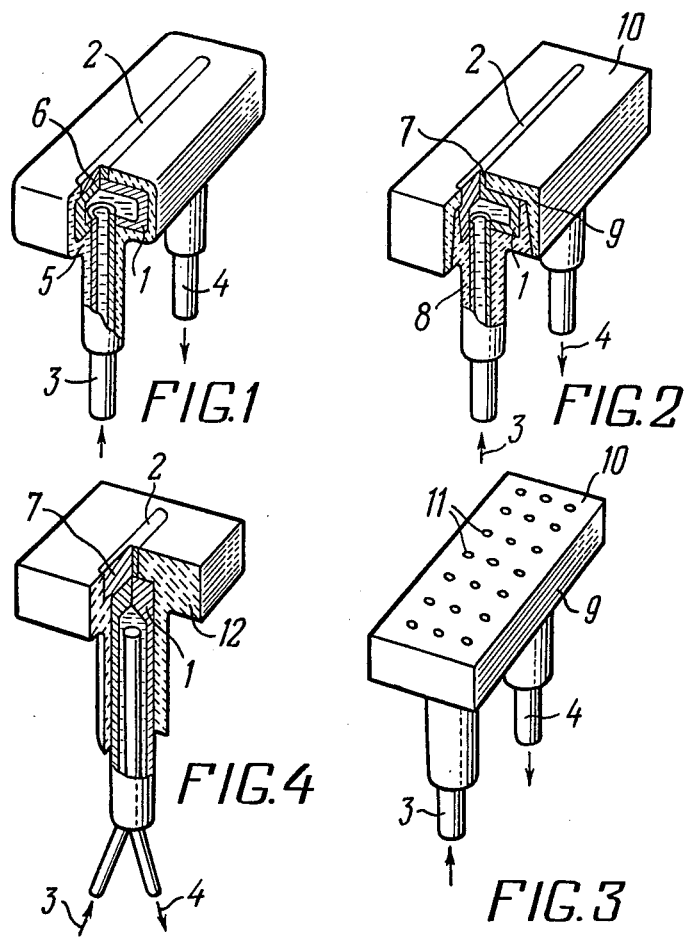

GAS-DISCHARGE CHAMBER ELECTRODE AND ELECTRODE SYSTEM USING SAME

FIELD OF THE INVENTION

The present invention relates to discharge chambers of gas-discharge, predominantly glow-discharge, devices, and more particularly to gas-discharge chamber electrodes and an electrode system using such electrodes.

The invention can most advantageously be used in designing electric-discharge reactors for plasmochemistry, in laser engineering for electric-discharge lasers with transverse gas flow, as well as in electrophysical engineering.

BACKGROUND OF THE INVENTION

Known in the art is a gas-discharge chamber electrode and an electrode system using such electrodes. The electrode system incorporates an insulating plate whereon groups of electrodes are mounted.

Each electrode extends into the gas flow and, firstly, creates a high aerodynamic resistance to the gas flow and, secondly, partially blocks the gas passage.

The prior art electrode system is not reliable in long-term operation and has a low stability.

There is also known a gas-discharge chamber electrode (cf. J. of Physic E.: Scientific Instruments, v. 4, No. 9, Sept., 1971, p. 708: "Electrode Configuration and Power Output for a Transverse Flow $CO_2$-Laser", N. Ben-Josef et al.) comprising a hollow metal member with an emitting portion on the gas-discharge side and coolant pipes. The electrode system based on such members comprises two electrodes (cathode and anode) wherebetween gas is blown.

The above electrode system is intended for a gas-discharge chamber operating in the glow-discharge mode and is limited by a pressure of up to 20 torr and a flow rate of 40 to 50 m/sec. When these parameters are exceeded, the glow discharge immediately loses its homogeneity, which is extremely undesirable and adversely affects the operation of the electrode system.

Attempts to increase the energy content in gas involve, primarily, a greater number of electrodes and a higher velocity of the gas blown between the electrodes. Both factors impair the gas-dynamic characteristics of the interelectrode space and impose more stringent requirements on the gas pumping means. The increase in pressure and the associated loss in homogeneity of the glow discharge lowers the stability and reliability of such a system and each electrode in operation.

SUMMARY OF THE INVENTION

It is an object of the present invention to improve the reliability and stability of electrodes in operation.

Another object of the invention is to increase the energy content in gas.

Still another object of the invention is to provide a reliable electrode system made up of interchangeable electrodes.

The invention resides in that an electrode comprising a hollow metal member with an emitting portion on the gas-discharge side, provided with coolant pipes, is, according to the invention, coated on the outside, except for the emitting portion, with a high-temperature dielectric layer.

Preferably, the high-temperature dielectric layer should be in the form of a film.

It is desirable that, on the wall of the hollow metal member on the gas-discharge side, at least one lug be provided, and that the high-temperature dielectric layer be in the form of a composite shell comprising a body of the same configuration as the hollow metal member with the coolant pipes and a cover having at least one through slot in its bottom, the hollow metal member being accommodated in the body and covered by the cover so that the lug of the hollow member is received by the slot in the cover bottom and has its tip flush with the outer surface of the cover.

The lug should preferably be in the form of a plate.

It is expedient that a plurality of studs be made on the wall of the hollow metal member, arranged in longitudinal and transverse rows, while through holes should be made in the cover bottom to receive the studs.

It is preferable that the hollow metal member be made as a cylinder having a solid end, with a lug being provided on the latter, while the high-temperature dielectric layer should be in the form of a solid shell enclosing the cylinder and having a cylindrical portion on the side of the cylinder's open end and a bottom with a through slot to receive the lug, the length of the slot exceeding the inner diameter of the shell.

The emitting portion should preferably be coated with a layer of a corrosion-resistant metal.

It is desirable that the electrode system comprise, according to the invention, at least two such electrodes.

Advantages of the proposed electrodes include simple design, the possibility of fully controlling the quality of any electrode component in the course of manufacture, and higher reliability thereof in operation. Such electrodes can be manufactured using conventional techniques adopted in the electrovacuum industry. When operating in a gas-discharge chamber, such electrodes release insignificant amounts of gas, which is essential when the gas-discharge chamber operates in a closed-loop system.

Electrode systems assembled of such electrodes feature high reliability because, firstly, each electrode can be tested separately, secondly, faulty electrodes can be easily replaced without disassembling the entire electrode system and, thirdly, mechanical distortions inevitable when pressure inside the gas-discharge chamber varies do not affect the high-temperature dielectric. The proposed electrodes permit assembling electrode systems for gas-discharge chambers of a broad power range, which substantially cuts down the cost of their designing and manufacture.

BRIEF DESCRIPTION OF THE DRAWINGS

The invention will now be described in greater detail with reference to specific embodiments thereof, taken in conjunction with the accompanying drawings, wherein:

FIG. 1 is an isometric view of a gas-discharge chamber electrode according to the invention;

FIG. 2 is an isometric view of another embodiment of the gas-discharge chamber electrode, according to the invention;

FIG. 3 is an isometric view of a third embodiment of the gas-discharge chamber electrode, according to the invention;

FIG. 4 is an isometric view of a fourth embodiment of the gas-discharge chamber electrode, according to the invention;

FIG. 5 is an isometric view of an electrode system composed of electrodes illustrated in FIGS. 1 to 4, according to the invention.

DETAILED DESCRIPTION OF THE INVENTION

Consider a gas-discharge chamber electrode used in laser engineering, e.g., in electric-discharge transverse gas flow lasers. The electrode comprises a hollow metal member 1 (FIG. 1) with an emitting portion 2 on the side of the gas-discharge zone (not shown) and provided with coolant pipes 3 and 4. On the outside, the hollow metal member 1 is coated, with the exception of the emitting portion, with a high-temperature dielectric layer 5. The layer 5 is applied on the metal member 1 as a film, using conventional techniques. Used for the purpose may be, for example, glass enamel or oxide coats based on aluminum or another metal. The emitting portion 2 of the metal member 1 is coated with a layer 6 of a corrosion-resistant metal, such as niobium or titanium.

In another embodiment, a lug 7 (FIG. 2) is made on the wall of the hollow metal member 1. The lug surface facing the gas-discharge zone serves as the emitting portion 2. The high-temperature dielectric layer 5 is made as a composite shell comprising a body 8 of the same configuration as the hollow metal member 1 with the cooling pipes, and a cover 9 having a through slot in its bottom 10. The metal member 1 is accommodated in the body 8 and covered by the cover 9 so that the lug 7 of the metal member 1 is received by the slot in the bottom 10 of the cover 9 and has its tip flush with the outer surface of the cover.

According to still another embodiment, a gas-discharge chamber electrode may be made having a plurality of studs 7 provided on the wall of the metal member 1 and arranged in longitudinal and transverse rows. In the bottom 10 of the cover 9 through holes 11 (FIG. 3) are made to receive the studs 7. The latter enter the holes 11 in the bottom 10 of the cover 9 so that their tips are flush with its outer surface and the end faces of the studs 7 serve as the emitting surface 2.

The high-temperature dielectric layer 5 may be made as a solid shell 12 (FIG. 4). In this case, the hollow metal member 1 is essentially a cylinder with a solid end on which a lug 7 is provided. The cylinder houses coolant pipes 3 and 4 arranged coaxially with the cylinder. The solid shell 12 has a cylindrical portion on the side of the open end of the metal member 1, and a bottom in which a through slot is made to receive the lug 7, the length of the slot exceeding the inner diameter of the shell 12.

Composite or solid shells from a high-temperature dielectric are made using any conventional technique, for example, hot slip forming of a high-temperature dielectric based on alumina.

In all embodiments, the emitting surface 2 may be coated with a layer of a corrosion-resistant metal.

Two or more electrodes 13 (FIG. 5) mounted on a base plate 14 (the mounting is not shown) make up an electrode system. Gas flows between the electrode system having a charge of one sign and an electrode 15 with a charge of the opposite sign. The arrangement of the electrode system relative to the electrode 15 is determined by the discharge gap. The electrode (FIG. 1) having a film coating is made by applying a layer of, e.g. glass enamel or an oxide coat based on aluminium or another metal, on a hollow metal member.

The electrodes (FIGS. 2 and 3) whose protective coating is the high-temperature dielectric layer 5 are assembled by bonding, the adhesive, e.g., an epoxy compound with a filler, being applied in advance on the mating surfaces.

In the case where the protection of the electrode (FIG. 4) is in the form of the solid shell 12, the electrode is assembled by, e.g., soldering the lug 7 to the hollow member 1, both being preinserted into respective cavities of the solid shell 12. The sealing of the lug 7 in the slot is achieved by soldering with a metallic or nonmetallic solder. When the electrode system (FIG. 5) is assembled, the electrodes 13 are fixed on the base plate 14 with the aid of nuts screwed on the threaded ends (not shown) of pipes with elastic gaskets being used to seal the pipes.

What is claimed is:

1. A glow discharge chamber electrode comprising:
    a hollow metal member having an electron-emitting zone on the surface of said hollow metal member facing a gas-discharge zone;
    branch pipes for supplying and withdrawing a coolant, said pipes being connected to said hollow metal member on the side which is opposite to the surface having said emitting zone; and
    a high-temperature dielectric layer applied on the outer surface of said hollow metal member, and completely covering said hollow metal member except for said emitting zone and for portions wherein the surface is conjugated with said coolant pipes.

2. An electrode as claimed in claim 1, wherein said high-temperature dielectric layer is made in the form of a film.

3. An electrode as claimed in claim 1, wherein said high-temperature dielectric layer is made in the form of a composite shell, said shell comprising:
    a body of said composite shell, having the same configuration as said hollow metal member together with said first and second coolant pipes;
    a cover of said composite shell is made in the form of a rectangular box whose bottom is provided with at least one through opening; and
    said hollow metal member having at least one lug whose surface facing the discharge zone is an emitting zone, said cover and said hollow metal member being arranged such that said at least one lug of said hollow metal member is inserted into said at least one through opening in said cover.

4. An electrode as claimed in claim 3, wherein said at least one lug is made in the form of a rib which is received by said opening provided in the bottom of said cover.

5. An electrode as claimed in claim 3, wherein said at least one lug is made in the form of a stud received by said opening provided in the bottom of said cover.

6. An electrode as claimed in claim 1, wherein said emitting zone is coated with a layer of a corrosion-resistant metal.

7. An electrode as claimed in claim 1, wherein:
    said hollow metal member is made in the form of a cylinder, one end of said cylinder being open, while the other end is solid;
    said at least one lug is made in the form of a rib and secured to said solid end of said cylinder;
    said high-temperature dielectric layer is made in the form of a solid unitary shell enclosing said cylinder, said shell being made on the side of said solid end of said cylinder;

a bottom of said shell, has a through slot whose length exceeds the diameter of said enclosed cylinder; and a said lug is made in the form of a rib received by said through slot.

8. A composite electrode system, comprising:

a set of electrodes each being formed of a hollow metal member having an electron-emitting zone on the surface of said hollow metal member facing a gas-discharge zone;

branch pipes for supplying and withdrawing a coolant, said pipes being connected to said hollow metal member on the side which is opposite to the surface having said emitting zone;

a high-temperature dielectric layer applied on the outer surface of said hollow metal member, and completely covering said hollow metal member, except for said emitting zone and for portions wherein the surface is conjugated with said coolant pipes;

an insulating plate;

said set of electrodes being arranged on said plate in longitudinal and transverse rows;

each of said electrodes arranged on said plate being connected to a common energy source through a stabilizing device; and said set of electrodes being arranged so that a gap is provided between any two adjacent electrodes mounted on said plate.

9. A composite electrode system as claimed in claim 8, wherein said high-temperature dielectric layer is made in the form of a film.

10. A composite electrode as claimed in claim 8, wherein:

said high-temperature dielectric layer is made in the form of a composite shell comprising a body having the same configuration as said hollow metal member together with said first and second coolant pipes;

a cover of said composite shell is made in the form of a rectangular box whose bottom is provided with at least one through opening; and said hollow metal member having at least one lug whose surface facing the discharge zone is an emitting zone, said cover and said hollow metal member being arranged such that said lugs of said hollow metal members are received by said through openings in said cover.

11. A composite electrode system as claimed in claim 10, wherein said lugs are made in the form of ribs which are received by openings provided in the bottom of said cover.

12. A composite electrode system as claimed in claim 10, wherein said lugs are made in the form of studs received by said openings provided in the bottom of said cover.

13. A composite electrode system as claimed in claim 8, wherein said emitting zone is coated with a layer of corrosion-resistant metal.

14. A composite electrode system as claimed in claim 8, wherein:

said hollow metal member is made in the form of a cylinder, said cylinder having a solid end and an open end;

at least one lug is made in the form of a rib and secured to said solid end of said cylinder;

said high-temperature dielectic layer is made in the form of a solid shell enclosing said cylinder, said shell being made on the side of said solid end of said cylinder;

a bottom of said shell, having a through slot whose length exceeds the diameter of said enclosed cylinder; and said lug being made in the form of a rib received by said through slot.

* * * * *